United States Patent [19]

Patterson et al.

[11] Patent Number: 5,259,009

[45] Date of Patent: Nov. 2, 1993

[54] BOILING WATER REACTOR FUEL ROD ASSEMBLY WITH FUEL ROD SPACER ARRANGEMENT

[75] Inventors: John F. Patterson, Richland; Richard H. Ewing, W. Richland, both of Wash.

[73] Assignee: Siemens Power Corporation, Richland, Wash.

[21] Appl. No.: 747,088

[22] Filed: Aug. 19, 1991

[51] Int. Cl.$^5$ .............................................. G21C 3/34
[52] U.S. Cl. ................... 376/439; 376/462; 376/442; 376/443
[58] Field of Search ............ 376/462, 442, 439, 443; 976/DIG. 80, DIG. 76, DIG. 77

[56] References Cited

U.S. PATENT DOCUMENTS

| | | | |
|---|---|---|---|
| Re. 30,247 | 4/1980 | Andrews et al. | 376/442 |
| 3,314,860 | 4/1967 | Wilman | 376/442 |
| 3,767,525 | 10/1973 | Seim et al. | 376/202 |
| 4,181,571 | 1/1980 | Jolly | 376/442 |
| 4,224,107 | 9/1980 | Delafosse et al. | 376/462 |
| 4,570,703 | 2/1986 | Ringsmuth et al. | 376/462 |
| 4,714,585 | 12/1987 | Kast | 376/442 |
| 4,726,926 | 2/1988 | Patterson et al. | 376/439 |
| 4,795,608 | 1/1989 | Nylund | 376/444 |
| 4,832,999 | 5/1989 | Sweet | 428/116 |
| 5,035,853 | 7/1991 | Lettau et al. | 376/441 |
| 5,084,237 | 1/1992 | Patterson et al. | 376/442 |

*Primary Examiner*—Donald P. Walsh
*Assistant Examiner*—Meena Chelliah
*Attorney, Agent, or Firm*—Ira Lee Zebrak

[57] ABSTRACT

A boiling water reactor fuel rod assembly is provided having a plurality of fuel rod spacers which are slidably receivable within an outer channel. Each of the rod spacers is formed of at least one lattice which defines a plurality of fuel rod retaining cells. The lattice is constructed of a plurality of pairs of oppositely facing springy support strips, with each support strip having a plurality of spring-loaded indentations. In an unloaded condition, oppositely facing indentations of each pair of strips, which define each cell, are displaced closer to one another. In a loaded condition, the oppositely facing cell indentations are forced away from each other by the fuel rods so that the springloaded indentations support and retain the fuel rods.

33 Claims, 3 Drawing Sheets

BOILING WATER REACTOR FUEL ROD ASSEMBLY WITH FUEL ROD SPACER ARRANGEMENT

BACKGROUND OF THE INVENTION

The invention relates to nuclear fuel rod assemblies for water reactors, and more particularly to a fuel rod spacer arrangement for boiling water reactors wherein the fuel rods are supported within an outer channel in a spaced and aligned fashion relative to one another.

OBJECTS OF THE INVENTION

It is an object of the invention to provide a nuclear fuel rod assembly for a boiling water reactor wherein a spacer assembly is provided which is of simple construction, yet provides a secure retention, alignment, and spacing for the nuclear fuel rods.

It is another object of the invention to provide a spacer system wherein the fuel rods can be easily loaded.

It is another object of the invention to provide a spacer system wherein moderator can flow freely therethrough.

It is a further object of the invention to create a turbulent flow so that coolant contact with the fuel rods is maximized and steam bubble contact with the fuel rods is minimized.

It is a further object of the invention to provide a spacer system which can be easily assembled.

It is another object of the invention to provide a spacer system which will not be substantially affected by irradiation.

SUMMARY OF THE INVENTION

According to the invention, a boiling water reactor fuel rod assembly is provided wherein a spacer system is formed of a plurality of spaced apart and parallel spacer strips. Each of the spacer strips has a plurality of corrugations. Corrugations of adjacent spacer strips are reversed relative to one another so as to create support cells for receiving fuel rods between the opposed corrugations. The spacer strips are constructed of a spring-action or resilient material such that prior to loading of the fuel rods, there is an unloaded displaced position of at least some of the corrugations. When a fuel rod is loaded into a cell, the fuel rod forces the portions of the spacer strip which are in their unloaded displaced position into a loaded position. Preferably, pairs of spacer strips are provided having their corrugations abutting each other back-to-back, with every other corrugation along the spacer strips being welded to one another. The unwelded corrugations can then attain by spring action the unloaded displaced position, with the corrugations then being spaced apart from one another.

Preferably the spacer strips are arranged to form a lattice or grid, with two of such lattices being positioned one above the other to form a rod spacer. A plurality of the rod spacers are provided at desired spaced intervals from top to bottom along the fuel rod assembly.

DESCRIPTION OF THE PREFERRED EMBODIMENTS

Figure 1:
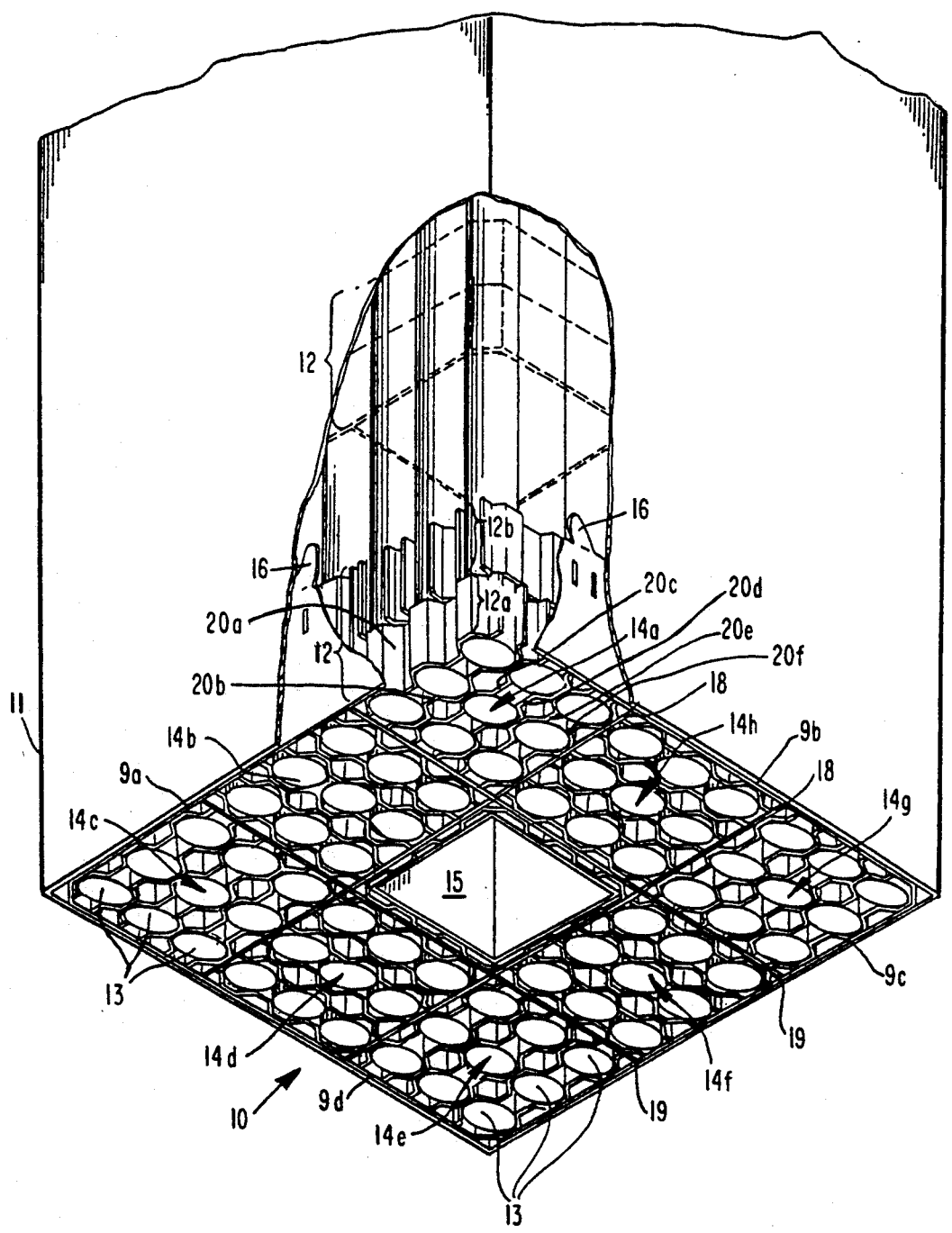
FIG. 1 is a perspective view with a partial cut-away from beneath a boiling water reactor fuel rod assembly employing a rod spacer system having a plurality of rod spacers according to the invention.

A portion of a boiling water reactor (BWR) fuel rod assembly employing the spacer system of the invention for retaining fuel rods 13 is generally shown at 10 in FIG. 1. Although the present invention will be described in relation to such a fuel assembly, it will be readily understood by those skilled in the art that the present invention can be used with any type of nuclear fuel assembly, not just BWR fuel assemblies or the BWR fuel assembly shown in FIG. 1.

The fuel assembly shown in FIG. 1 has a central water channel which extends along the length of the fuel assembly. A common problem in typical boiling water reactors is that the central region of the fuel assemblies may be undermoderated and over-enriched. In order to increase the flow of moderator, an elongated central water channel is provided which includes a centrally disposed path for the flow of moderator/coolant along the length of the fuel rods in order to improve neutron moderation and economy. The central water channel can be of any cross-sectional area and/or geometry, positioned centrally and symmetrically within the outer channel, or asymmetrically displaced from the central axis within the outer channel, and can be oriented around its central axis so that its walls which extend the length of the assembly are either parallel or non-parallel to the walls of the outer channel. In FIG. 1, central water channel 15 is centrally located within outer channel 11.

Outer rectangular channel 11 has retained therein a plurality of rod spacers 12 arranged at different elevations along the length of fuel assembly 10. The bottommost spacer 12 at the end of the assembly, is shown in FIG. 1. Rod spacers are located at selected spaced intervals, and in a preferred embodiment are typically positioned at 15 to 22-inch intervals along the length of the fuel rod bundle. Another rod spacer 12 positioned along the length of fuel assembly 10 is shown in phantom above the bottom spacer 12. Other spacers, although not shown, are similarly positioned along the length of fuel assembly 10.

Figure 2:
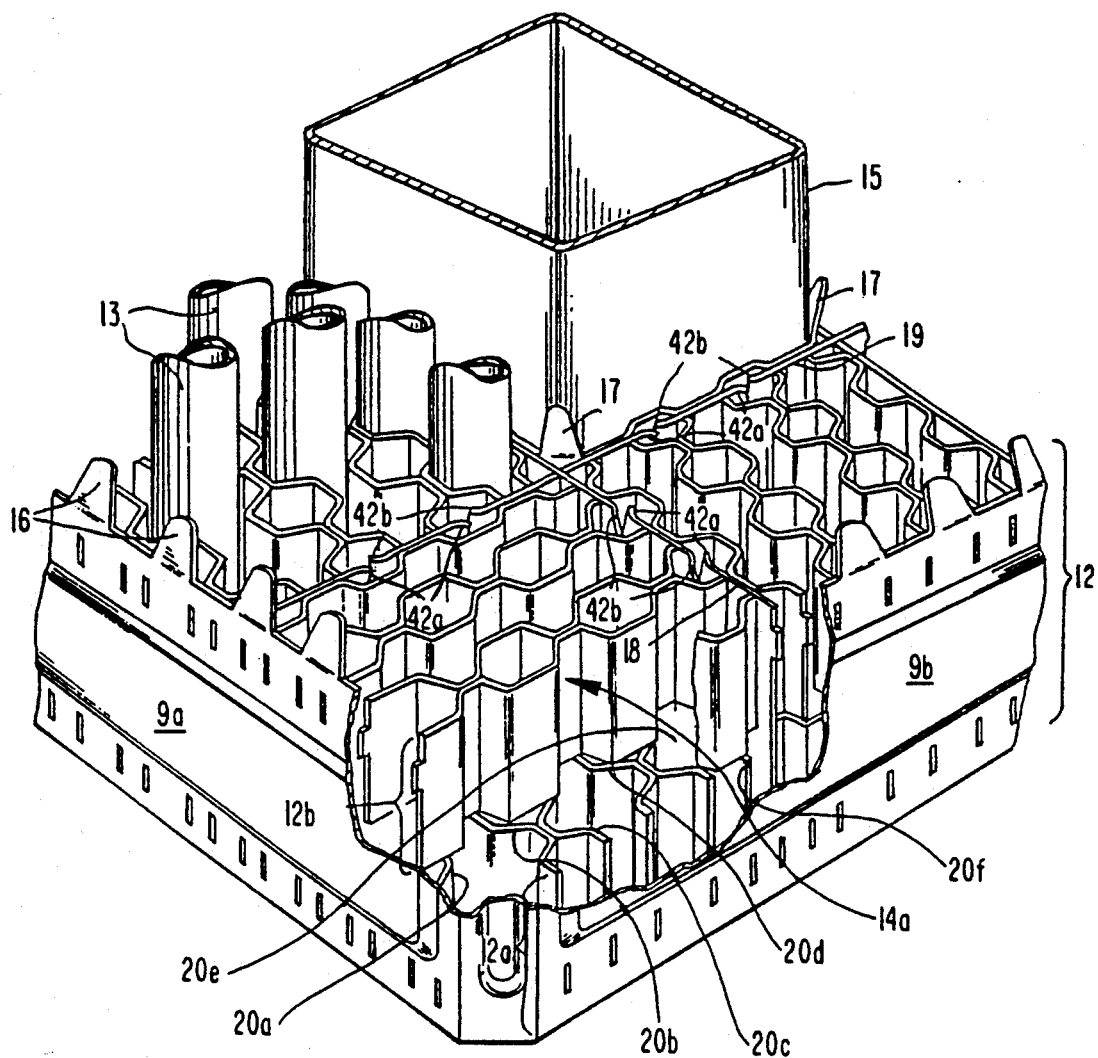
FIG. 2 is a perspective fragmentary view looking from the side and down upon a portion of the rod spacer shown in FIG. 1 at the bottom of the fuel rod assembly.

FIG. 2 is a perspective view looking from the side and down the fuel assembly 10 depicted in FIG. 1 and shows a lower portion of the assembly, including bottom spacer 12, with the outer channel 11 removed. Although most of the fuel rods 13 are not shown in FIG. 2 for clarity of illustration, each of the spacer strips 20 are all shown in their "loaded" position, as explained hereinafter.

Each of rod spacers 12 is formed of a lower lattice or grid 12a and a closely adjacent upper lattice or grid 12b. Fuel rods 13 are securely retained by each of the upper and lower lattices of each spacer. Spacers 12 each have four outer sidewalls 9a, b, c, d, which extend along the width and depth of outer channel 11 as shown in FIGS. 1 and 2. Dividing or stiffening plates 18, 19 divide each spacer 12 into nine separate subregions. Eight of such regions (14a through 14h) shown in FIG. 1 contain fuel rods 13 and one region houses central channel member 15. Although any number of plates can be used and form subregions having equal or unequal cross-sectional areas, it will also be readily understood by those skilled in the art that the present invention can be practiced with or without dividing plates which form subregions.

Figure 3:
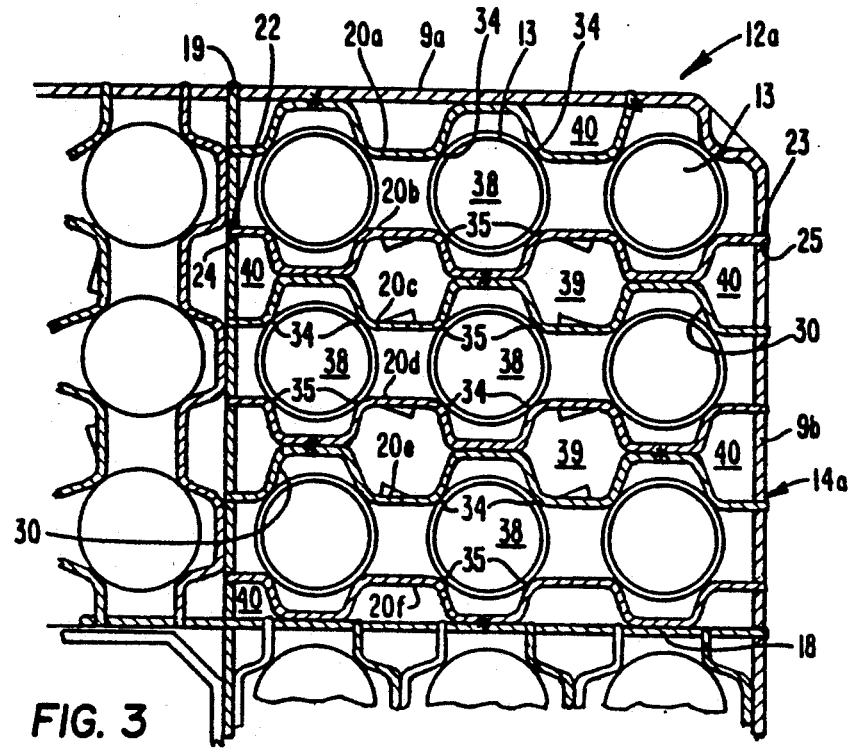
FIG. 3 is a fragmentary plan view of one region of a lattice of the bottom rod spacer shown in FIG. 1.
Figure 4:
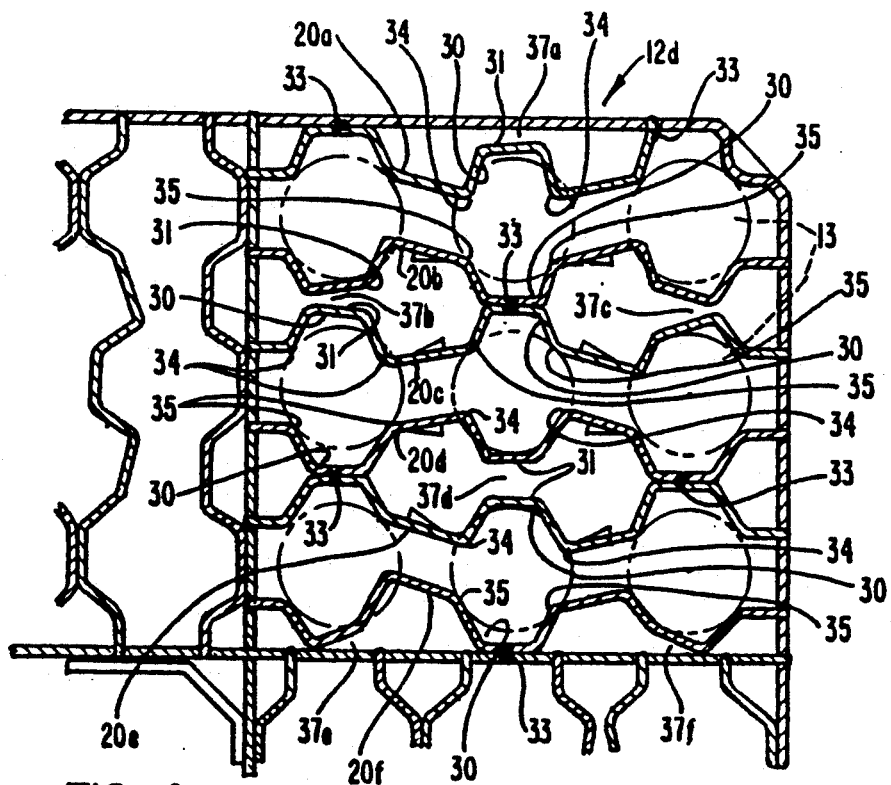
FIG. 4 is a fragmentary plan view of the region of the lattice of the rod spacer shown in FIG. 3 prior to loading of the rods.

FIGS. 3 and 4 are plan views looking up from the bottom of the fuel assembly. The structure of spacers 12 is shown in the perspective view of FIG. 2 and the plan view of FIGS. 3 and 4 showing a cross-sectional view of one subregion, and more particularly region 14a of lower lattice 12a illustrated in FIG. 1. Each of the upper and lower lattices 12b, 12a of spacers 12 is formed of spacer strips. Spacer strips 20a through 20f are provided for each of the upper and lower lattices 12b, 12a of each spacer 12 within each subregion 14a through 14h. Spacer strips 20a and 20f of subregion 14a of lower lattice 12a shown in FIG. 3 are positioned along sidewall 9a and stiffening plate 18, respectively. Ends 22, 23 of each of spacer strips 20a through 20f are respectively received and secured in slots 24 and 25 in stiffening plate 19 and side wall 9b. In lieu of slots for supporting the ends of the spacer strips, welds may be provided.

As can be seen in FIG. 1, the orientation of spacer strips 20a through 20f alternate by 90° from subregion to subregion in a lateral direction. Also, as can be seen in FIGS. 1 and 2, for each spacer, spacer strips 20a through 20f in each of the subregions of lower lattice 12a are oriented at 90° relative to spacer strips 20a through 20f in adjacent upper lattice 12b.

As shown in FIG. 4, each of spacer strips 20a-f has corrugations 30. Each corrugation 30 is three-sided and extends vertically to form a three-sided groove or channel. Each corrugation has a face 31. With the fuel rods 13 loaded into spacer lattice 12a as shown in FIG. 3, faces 31 of corrugations 30 of spacer strip 20b abut with the oppositely positioned and reversed faces 31 of corrugations 30 of spacer strip 20c. Where adjacent and reversed faces 31 of corrugations 30 of spacer strips 20b and 20c abut one another, faces 31 are welded to one another in every other column, as indicated by the asterisk * at 33. Thus, in each row, the abutting corrugations alternate welded and unwelded. Similarly, the alternate abutting faces 31 of spacer strips 20d and 20e are welded together at 33.

In addition, alternate faces 31 of spacer 20a are welded to side wall 9a, and alternate faces 31 of spacer strip 20f are similarly welded at 33 to stiffening plate 18 as shown in FIGS. 3 and 4. Thus, weld points alternate in each row and column within the spacer. The significance of the alternating weld points, is apparent from the FIG. 4 which is of the same spacer shown in FIG. 3, but before loading fuel rods 13 in the spacer. As is shown in FIG. 4, faces 31 of corrugations 30 of adjacent spacer strips which are not welded together are spaced apart due to the resilience and shape of the individual spacer strips. The spaced apart relationship of unloaded spacers are shown as gaps 37b-37d in FIG. 4. The space or gap between face 31 of spacer strip 20a and wall 9a is shown as 37a and the spaces between faces 31 of strip 20f and stiffening plate 18 are shown as 37e and 37f in the unloaded spacer shown in FIG. 4. Thus, in the unloaded condition, corrugations 30 are not in line along a row, but rather are displaced and staggered or tilted by the integral spring force provided by the spacer strip material. The positioned fuel rods 13, once they are loaded in the unloaded spacer strips, are shown in phantom in FIG. 4.

Accordingly, with the fuel rods loaded, corrugations 30 are in line such as shown in FIG. 3 and exert a retaining pressure on the fuel rods 13 which are positioned between the opposite facing concave corrugations which form rod supporting cells 38. Thus, supporting cells are created between oppositely facing concave portions of the corrugations. With the exception of the fuel rod in each outer corner of the fuel assembly, each fuel rod 13 in each cell 38 is supported by two spring edges 34 of corrugation 30 forcing rod 13 against two stationary supports 35 of corrugation 30 as shown in FIGS. 3 and 4. As can best be seen in FIGS. 1 and 2, the spacer strips in each subregion of the upper lattice grid 12b are oriented 90° relative to those in lower lattice grid 12a. Thus, the direction of the forces applied by spring edges 34 against the fuel rods and the fuel rods against supports 35 in upper lattice grid 12b are similarly oriented 90° relative to the forces in lower lattice grid 12a. Furthermore, as is evident from FIG. 1, the alternating direction of the spacer strips from subregion to subregion provides improved uniformity for both flow resistance and lateral strength. The arrangement provides a very strong overall support arrangement which opposes a failure due to lateral loading.

In the region between four loaded adjacent fuel rods 13, an open space 39 is formed by two adjacent spacer strips (FIG. 3). Open spaces 39 which are formed by spacer strips between any four adjacent fuel rods within a subregion allow steam bubbles to flow unobstructed up the center between the four adjacent fuel rods, while allowing primarily liquid moderator to flow around the fuel rods, thus enhancing heat transfer. Four such open areas 39 are provided in each subassembly in the embodiment shown in FIG. 3. In addition, several other partial open areas 40 are also provided.

Spring relaxation as a result of irradiation of spacer strips 20, and more particularly spring edges 34 and stationary support 35 of corrugations 30, is reduced by constructing the stiffening plates 18, 19 of annealed zircaloy and spacer strips 20a, 20b, 20c, 20d, 20e, and 20f of cold worked stress relieved zircaloy. The greater irradiation induced growth rate of the cold worked material restrained by the lower growth rate of the annealed material tends to cause the resilient spacer strips to move toward the fuel rods and provide a spring force against the fuel rods, reducing irradiation induced spring relaxation.

Figure 5:
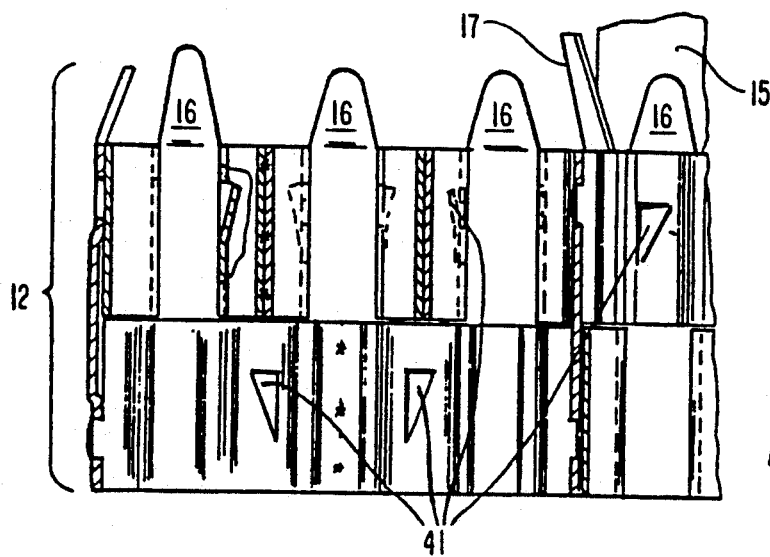
FIG. 5 is a fragmentary side view of a portion of one of the rod spacers of the spacer system shown in FIG. 1.

As shown in FIGS. 2 and 5, each of the spacers 12 preferably has inwardly bent guiding tabs 16 extending from the top edge of side walls 9a, b, c and d at the upper spacer lattice 12b. Inwardly bent guiding tabs 16 allow ease of placement of the outer channel 11 over the spacers. Inwardly bent guiding tabs 16 and outwardly bent tabs 17 also serve the purpose of directing liquid water which has condensed on the outer and inner channels 11, 15 towards the fuel rods, enhancing local heat transfer.

According to another feature of the invention, kickouts 41 positioned on side walls 9a, 9b, 9c and 9b (FIG. 5) and tabs 42a, 42b (FIG. 2) positioned at the top of stiffening plates 18, 19 may be provided. Kick-outs 41 and tabs 42a, 42b are arranged to impart a circular motion to the two-phase coolant flow. This circular motion tends to coalesce small water droplets into larger water droplets aiding in their transfer to the fuel rod surfaces. Tests have shown that the net effect is an increase in water film thickness on the fuel rod, resulting in an improvement in local heat transfer.

While the foregoing description and drawings represent the preferred embodiments of the present invention, it will be obvious to those skilled in the art that various changes and modifications may be made therein without departing from the true spirit and scope of the present invention.

We claim:

1. A fuel rod spacer assembly for retaining fuel rods within an outer channel of a fuel rod assembly provided in a reactor, comprising:
    a plurality of parallel spacer strips, and means for supporting the strips in a spaced apart relationship which is dimensioned to permit the strips to be received in the outer channel;
    each of the spacer strips having a plurality of concave corrugations, each of said corrugations having an interior portion and wherein the interior portion of the concave corrugations of oppositely facing spacer strips face each other so as to create fuel rod supporting cells therebetween; and
    at least portions of at least one of each of the facing spacer strips comprising a springy material which causes at least one of the corrugations for each of the supporting cells to assume an unloaded displaced position which is closer to the opposite facing corrugation than when the fuel rod is loaded in the cell, thus forcing the corrugation to assume a loaded position.

2. An assembly according to claim 1 wherein said means for supporting comprises peripheral sidewalls surrounding and supporting the spacer strips.

3. An assembly according to claim 1 wherein pairs of spacer strips are provided back-to-back and having back faces of their corrugations in direct abutment with one another, at each second pair of abutting corrugations a connection being provided fixing the abutting corrugation faces together, the remaining corrugations of each pair of back-to-back strips not being connected together such that the adjacent corrugations are separated from one another at their back faces in said unloaded displaced position of the corrugations.

4. An assembly according to claim 1 wherein each of the opposite facing spacer strips comprises a springy material such that in the unloaded position, every second corrugation assumes an unloaded displaced or staggered position so that for each cell one of the corrugations is in its unloaded displaced position and is more closely spaced to the opposite corrugation than is the case with a fuel rod loaded therein.

5. An assembly according to claim 3 wherein the connections between corrugations for one pair of back-to-back spacer strips are offset by one corrugation as compared to connections between alternating corrugations for an adjacent pair of back-to-back spacer strips.

6. An assembly according to claim 1 wherein said springy material of each spacer strip comprises a cold worked stress relieved zircaloy.

7. An assembly according to claim 1 wherein the strips are arranged to form a lattice employed as a rod spacer having sub-regions of rod supporting cells, each sub-region being segregated by walls and wherein the spacer strips of one sub-region relative to an adjacent sub-region are oriented 90° relative to one another.

8. An assembly according to claim 7 wherein the rod spacer has peripheral side walls surrounding the sub-regions.

9. An assembly according to claim 7 wherein the rod spacer has a central sub-region which is open and dimensioned for surrounding a central channel member of the reactor fuel rod assembly.

10. An assembly according to claim 1 wherein the strips define a lattice which is formed as a rod spacer, and means are provided on the rod spacer for sliding the fuel rod assembly outer channel thereover.

11. An assembly according to claim 10 wherein the rod spacer is formed of an upper spacer lattice and an adjacent lower spacer lattice.

12. An assembly according to claim 10 wherein a plurality of the rod spacers are provided for being positioned at spaced intervals from top to bottom along the fuel rod assembly outer channel.

13. A fuel rod assembly for retaining fuel rods within a channel of a reactor, comprising:
    a plurality of spaced apart and parallel spacer strips within the channel arranged in pairs, and means for supporting the strips in a spaced apart relationship which is dimensioned to permits the strips to be received in the outer channel;
    each of the spacer strips having a plurality of concave corrugations, each of said corrugations having an interior portion and wherein the interior portion of the concave corrugations of oppositely facing spacer strips face each other so as to create fuel rod supporting cells therebetween; and
    at least one of the spacer strips for each pair having spring means such that when fuel rods are not loaded a plurality of portions of the spacer strips are in a displaced position, and wherein the fuel rods are loaded between strips of a pair, the portions are no longer in their displaced positions and exert a spring force against the fuel rods.

14. A BWR fuel rod spacer assembly for retaining fuel rods within a channel of the reactor, comprising:
    a spacer means for being received within the outer channel, the spacer means having a plurality of spaced apart and parallel spacer strips arranged in pairs; and
    at least one of the spacer strips for each pair comprising a springy material and having a plurality of spring-loaded corrugations, each of said corrugations having an interior portion and wherein the interior portion of the corrugations of oppositely facing spacer strips face each other defining fuel rod supporting cells at spaced intervals along and between each pair of spacer strips.

15. An assembly according to claim 14 wherein the spacer means has a plurality of sub-regions of spacer strip pairs and wherein a central sub-region is provided which is open and is dimensioned for receiving a central channel member of the reactor fuel rod assembly.

16. An assembly according to claim 14 wherein a plurality of said spacer means are provided for being positioned at spaced intervals along the outer channel.

17. An assembly according to claim 14 wherein the spacer means has outer peripheral side walls with the spacer strips having ends thereof mounted to the peripheral side walls.

18. An assembly according to claim 17 wherein ends of the strips are received in slots in the peripheral side walls.

19. An assembly according to claim 14 wherein the spacer means have means for permitting the spacer means to be slidably received within the outer channel.

20. An assembly according to claim 19 wherein bent guiding tabs protrude from the spacer means.

21. An assembly according to claim 14 wherein at least some of the strips have flow deflecting projections.

22. A fuel rod spacer assembly, comprising:
a plurality of spaced apart and parallel spacer strips defining a lattice surrounded by outer peripheral side walls, opposite ends of the spacer strips being attached to the side walls adjacent the spacer strip ends;
each of the spacer strips having a plurality of concave corrugations, each of said corrugations having an interior portion and the interior portion of the concave corrugations of oppositely facing spacer strips facing each other so as to create fuel rod supporting cells therebetween; and
at least portions of at least one of each of the facing spacer strips comprising a springy material which causes at least one of the corrugations for each of the supporting cells to assume an unloaded displaced position which is closer to the opposite facing corrugation than when the fuel rod is loaded in the cell, thus forcing the corrugation to assume a loaded position.

23. A spacer assembly according to claim 22 wherein upper and lower lattices comprised of said spacer strips are provided directly adjacent each other, and with the outer peripheral side walls surrounding the upper and lower lattices.

24. A spacer assembly according to claim 22 wherein the corrugations are three-sided.

25. A spacer assembly according to claim 22 wherein the corrugation for each of the supporting cells which assumes an unloaded displaced position provides first and second rod supporting spring edges, and the opposite facing corrugation provides first and second stationary support edges.

26. A spacer assembly according to claim 22 wherein stiffening plates which are orthogonal to one another and which are mounted at their ends to the outer peripheral side walls define sub-regions, with each sub-region containing a plurality of said fuel rod supporting cells.

27. A fuel rod spacer assembly according to claim 22 wherein portions of the strips between the corrugations define open areas which are centrally located with respect to four surrounding fuel rod supporting cells, said open areas being dimensioned to permit steam bubble flow in unobstructed fashion up a center between the four adjacent fuel rods while allowing primarily liquid moderator to flow around the fuel rods so as to enhance heat transfer.

28. A spacer assembly according to claim 22 wherein the spacer is divided into sub-regions by stiffening plates, and the stiffening plates being formed of annealed zircaloy and the spacer strips being formed of cold worked stressed relieved zircaloy such that a greater radiation induced growth rate of the cold worked zircaloy restrained by a lower growth rate of the annealed zircaloy tends to cause the spacer strips to move toward the fuel rods and provide spring force against the fuel rods, thus reducing irradiation induced spring relaxation.

29. A spacer assembly according to claim 22 wherein stiffening plates are provided for sub-dividing the spacer into sub-regions, and tab means being positioned at a top of the stiffening plates to impart a circular motion to coolant flow to coalesce small water droplets into larger water droplets aiding in their transfer to fuel rod surfaces.

30. A spacer assembly according to claim 22 wherein stiffening plates sub-divide the fuel rod spacer into sub-regions, and spacer strips being provided in each sub-region which alternate in direction relative to an adjacent sub-region so as to improve uniformity for both flow resistance and lateral strength.

31. A spacer assembly according to claim 22 wherein the spacer is sub-divided into upper and lower lattice grids each having its own spacer strips, each of the lattice grids is sub-divided into sub-regions by stiffening plates, and the spacer strips in each sub-region of the upper lattice grid being oriented 90° relative to those in the lower lattice grid so that a direction of forces applied against the fuel rods are oriented 90° relative to forces in the lower lattice grid applied to the same fuel rods.

32. A spacer assembly according to claim 22 wherein the concave corrugations are three-sided with one of the sides forming a back face, and wherein back faces of the spacer strips having the springy material portions being in line in the loaded position and being staggered in the unloaded position.

33. A reactor fuel rod assembly, comprising:
an outer channel;
a plurality of spaced apart and parallel spacer strips within the outer channel;
each of the spacer strips having a plurality of concave corrugations, each of said corrugations having an interior portion and wherein the interior portion of the concave corrugations of oppositely facing spacer strips face each other so as to create fuel rod supporting cells therebetween; and
at least portions of at least one of each of the facing spacer strips comprising a springy material which causes at least one of the corrugations for each of the supporting cells to assume an unloaded position which is closer to the opposite facing corrugation that when the fuel rod is loaded in the cell, thus forcing the corrugation to assume a loaded position.

* * * * *